United States Patent
Taniuchi et al.

[11] Patent Number: 6,007,221
[45] Date of Patent: Dec. 28, 1999

[54] HEAD LAMP FOR VEHICLE

[75] Inventors: Hitoshi Taniuchi; Hiroshi Iwasaki; Tsutomu Yamamoto, all of Tokyo; Toshiaki Aoki, Yokohama, all of Japan

[73] Assignee: Stanley Electric Co., Ltd., Japan

[21] Appl. No.: 09/036,124

[22] Filed: Mar. 6, 1998

[30] Foreign Application Priority Data

Mar. 7, 1997 [JP] Japan .................................. 9-053390

[51] Int. Cl.$^6$ .................................................. B60Q 1/06
[52] U.S. Cl. .......................... 362/465; 362/284; 362/464; 362/324; 362/351; 362/281
[58] Field of Search .................... 362/460, 464, 362/465, 466, 467, 468, 513, 514, 539, 352, 276, 802, 305, 324, 322, 282, 284, 281

[56] References Cited

U.S. PATENT DOCUMENTS

| | | | |
|---|---|---|---|
| 4,875,141 | 10/1989 | Miyauchi et al. | 362/465 |
| 5,130,903 | 7/1992 | Fast et al. | 362/466 |
| 5,161,875 | 11/1992 | Sekiguchi et al. | 362/351 |
| 5,213,406 | 5/1993 | Neumann et al. | 362/61 |
| 5,264,993 | 11/1993 | Neumann et al. | 362/61 |
| 5,599,085 | 2/1997 | Tabata et al. | 362/72 |
| 5,769,525 | 6/1998 | Daumueller et al. | 362/284 |

FOREIGN PATENT DOCUMENTS

| | | | |
|---|---|---|---|
| 411544 | of 1991 | European Pat. Off. | |
| 454649 A1 | 4/1991 | European Pat. Off. | F21M 3/25 |
| 705730 A2 | 9/1995 | European Pat. Off. | B60Q 1/14 |
| 2239862 | 2/1973 | France | B60Q 1/04 |
| 2657681 | 12/1990 | France | F21M 3/18 |
| 6450301 | of 1989 | Japan . | |
| 630553 | of 1994 | Japan . | |
| 8111101 | of 1996 | Japan . | |

*Primary Examiner*—Thomas M. Sember
*Attorney, Agent, or Firm*—Ostrolenk, Faber, Gerb & Soffen, LLP

[57] ABSTRACT

A head lamp for a vehicle wherein an actuator is made to be able to be moved to a leveling actuation range corresponding to output from a vehicle body sensor and to a beam change position B out of a leveling actuation range when a beam changing switch is set to a drive beam position, and if the actuator is moved to the beam change position B at least a part covering a lower half of a discharge lamp of the hood is moved back to switch it from a passing beam state to a drive beam state. The actuator for leveling actuation indispensable to be provided for the head lamp for a vehicle having the discharge lamp as a light source, makes it possible also to switch between the passing beam state and drive beam state, thereby dissolving problems of large size and high cost of the head lamp.

2 Claims, 4 Drawing Sheets

HEAD LAMP FOR VEHICLE

BACKGROUND OF THE INVENTION

1. Field of the Invention

The present invention relates to a head lamp for a vehicle such as automobiles and bicycles. More particularly, the present invention relates to a head lamp having a discharge lamp, such as metal halide lamp, used as light source that is hard to contain two light sources closely adjacent to each other for passing beam state and driving beam state.

2. Background Art

There are many applications for a head lamp 90 constructed to switch it between a passing beam state and a drive beam state with use of a discharge lamp as a light source. For example, there has been proposed the head lamp in Laid-Open Japanese Patent Application No. 8-111101. As major parts of the head lamp is shown in FIG. 7, a top of a discharge lamp 91 is held with a fulcrum 92a as an axis, a lever 92 is provided in a perpendicular direction thereof, and a burner 91a is positioned on roughly an optical axis Z as a passing beam position.

In that construction, to switch to the drive beam state, the lever 92 is moved back with the fulcrum 92a as center of turning by an actuator 94 such as a motor or a solenoid to turn the discharge lamp 91 by a specific angle a. This moves the discharge lamp 91 from the passing beam position to the drive beam position that is backward and downward relative to the reflecting mirror 93.

The head lamp 90 mentioned above can considerably increase amount of light as it uses the discharge lamp 91 as a light source, thus being effective for a driver to increase visibility. However, the passing beam of the head lamp 90 causes much dazzling even with the head lamp 90 moved little upward for oncoming cars, particularly in a road having a large amount of traffic.

To solve such a problem, there has been proposed another head lamp having an automatic leveling device used therein. Namely, to overcome a moving condition that a front portion of a vehicle may be moved up if a weight matter is put on a rear body or if starting or acceleration is made, the automatic leveling device can automatically adjust angles of elevation and depression of the reflecting mirror 93 of the head lamp 90 depending on state of a suspension, thereby preventing the illumination light from directing upward.

However, with such an arrangement, the head lamp 90 has an disadvantage that it needs such a device for automatically leveling in addition to a mechanism for switching between the passing beam state and drive beam state. In addition, the head lamp 90 is involved in such a problem that it is complicated in construction and made large size and high cost.

SUMMARY OF THE INVENTION

To solve the problems of the prior art discussed above, the present invention provides a head lamp for a vehicle comprising:

a discharge lamp as a light source;

a reflecting mirror for reflecting a light from the discharge lamp;

a hood for generating a passing beam distribution by way of covering roughly lower half of the discharge lamp; and an automatic leveling device including an actuator for adjusting angles of elevation and depression of the reflecting mirror as driven by output of a vehicle body sensor for detecting an inclination of a vehicle body, wherein the actuator is made to be able to be moved to a leveling actuation range corresponding to output from the vehicle body sensor and to a beam change position out of the leveling actuation range when a beam changing switch is set to a drive beam position, and if the actuator is moved to the beam change position, at least a part covering the lower half of the discharge lamp of the hood is moved back to switch it from a passing beam state to a drive beam state.

In the head lamp for a vehicle, the hood comprises a direct light shield and a lower half shield and if the actuator is moved to the beam change position the lower half shield of the hood is moved back to switch it from the passing beam state to the drive beam state.

DETAILED DESCRIPTION OF THE PREFERRED EMBODIMENTS

Figure 1:
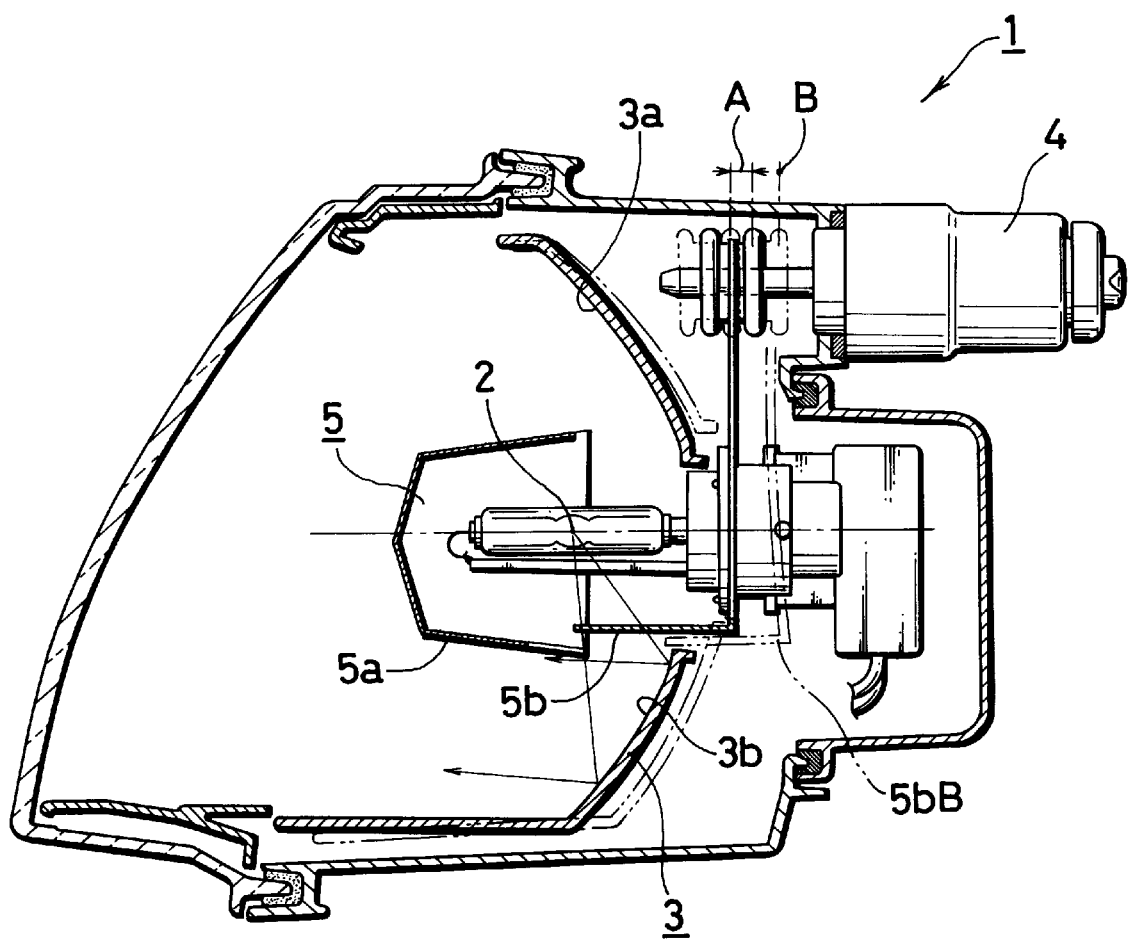
FIG. 1 is a cross-sectioned view illustrating an embodiment of a head lamp for a vehicle according to the present invention.

The present invention will be described in detail on basis of an embodiment by reference to the accompanying drawings. In FIG. 1, reference numeral 1 designates a head lamp for a vehicle according to the present invention. The head lamp 1 for a vehicle has a discharge lamp 2, such as metal halide lamp, as a light source. The head lamp 1, like the prior art, also has an actuator 4 for adjusting an angle of elevation of a reflecting mirror 3 to prevent dazzling light from being caused by change of posture of a vehicle body. It should be noted that an arrangement for adjusting the angle of elevation of the reflecting mirror 3 is not shown to describe essential parts of the present invention.

The discharge lamp 2 has a hood 5 provided therein. The hood 5 comprises a direct light shield 5a for shielding a direct light from the discharge lamp 2 to prevent a driver of an oncoming car from dazzling and a lower half shield 5b for generating a passing beam by use of only a part of light from the discharge lamp 2 reaching an upper half 3a of the reflecting mirror 3 by shielding another part of the light reaching a lower half 3b of the reflecting mirror 3.

Figure 2:
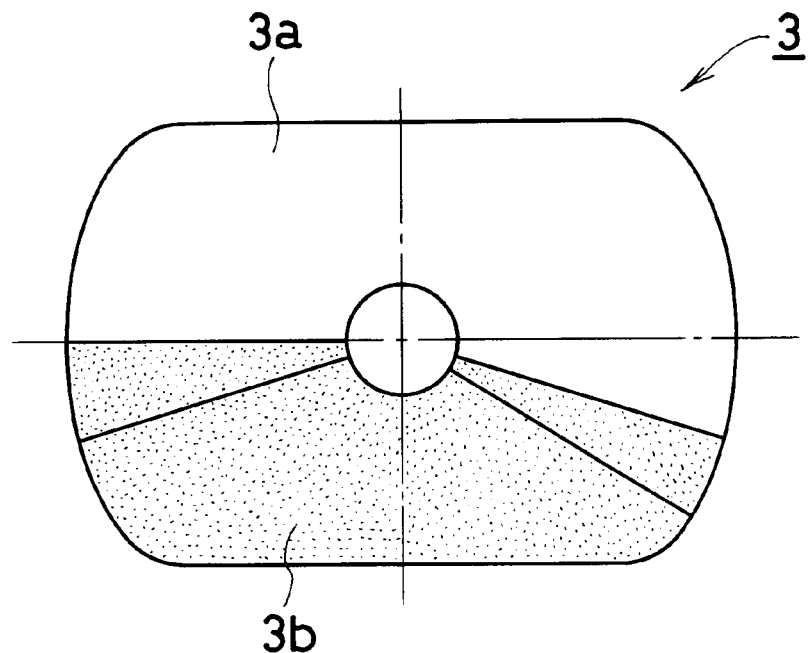
FIG. 2 is a view illustrating a light reflection state of a reflecting mirror in generating a passing beam distribution of the same embodiment as above.

FIG. 2 depicts a front view of the reflecting mirror 3 illustrating a light reflection state thereof. The hood 5 having the lower half shield 5b provided at the discharge lamp 2 prevents the light from reaching the lower half 3b of the reflecting mirror 3. For the reason, light distributed by the head lamp 1 for a vehicle is formed roughly of the light reflected by the upper half 3a of the reflecting mirror 3.

Figure 3:
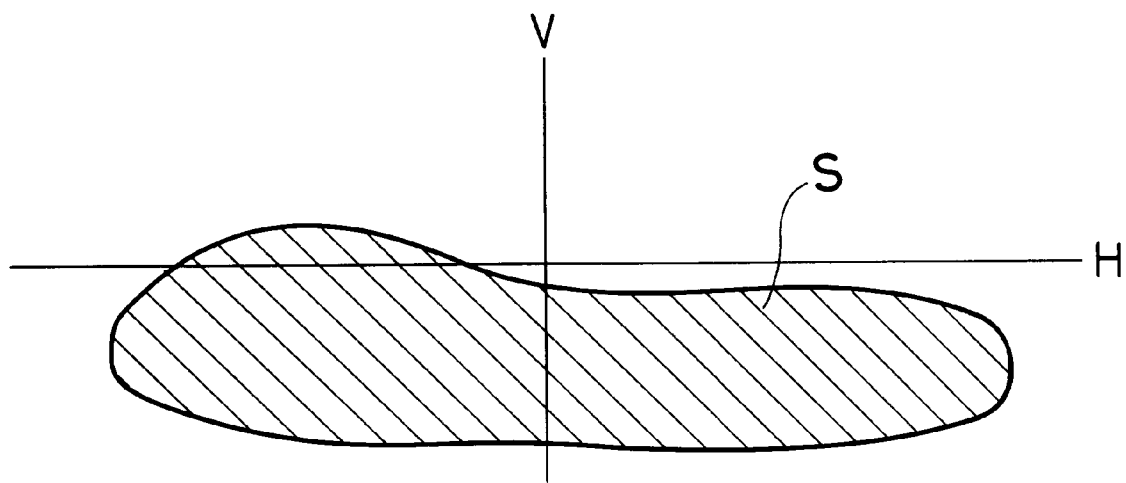
FIG. 3 is a view illustrating the passing beam distribution of the same embodiment as above.

When the reflecting mirror 3 is formed of paraboloid of revolution and a focus of the paraboloid of revolution is set at a point near a rear end of a light emitting part (arc) of the discharge lamp 2, this makes the light reflected by the upper half 3a of the reflecting mirror 3 direct from level to downward. This means that as shown in FIG. 3, the light from the discharge lamp 2 can be theoretically made to distribute a passing beam distribution S, not to contain upward light.

The actuator 4 of the embodiment can be moved to a leveling actuation range A corresponding to output from a vehicle body sensor (not shown) provided conventionally. The actuator 4 can also be moved to a beam change position B when a beam changing switch (not shown) is turned from a passing beam contact to a drive beam contact by a driver of a vehicle (see FIG. 1). The beam change position B is set out of the leveling actuation range A.

In addition, the embodiment has at least a part of the lower half shield 5b of the hood 5 made to move. If the actuator 4 is moved to the beam change position B, the lower half shield 5b is also moved back, as shown at a position 5bB in FIG. 1, along with the actuator 4 to go away from the shielding position, thereby allowing also the light of the discharge lamp 2 to reach the lower half 3b of the reflecting mirror 3.

Figure 4:
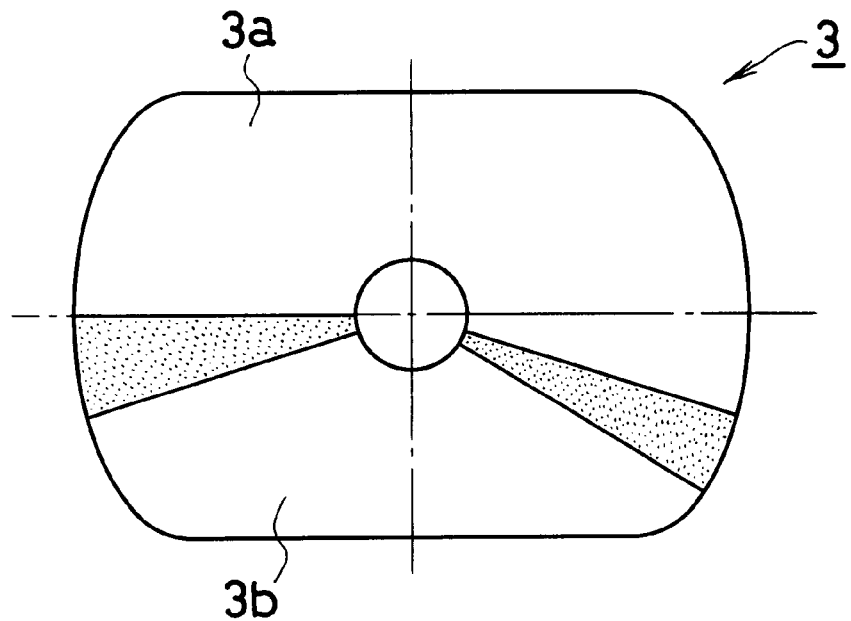
FIG. 4 is a view illustrating a light reflection state of the reflecting mirror in generating a drive beam distribution of the same embodiment as above.

FIG. 4 depicts another front view of the reflecting mirror illustrating a light reflection state thereof with the lower half shield 5b moved back from the shielding position. The light from the discharge lamp 2 also reaches the lower half 3b of the reflecting mirror 3 to reflect. In that state, as described above, with the reflecting mirror 3 formed of paraboloid of revolution and the focus of the paraboloid of revolution set at the point near the rear end of the light emitting part (arc) of the discharge lamp 2, the light reflected by the lower half 3b is made to direct from level to upward.

Figure 5:
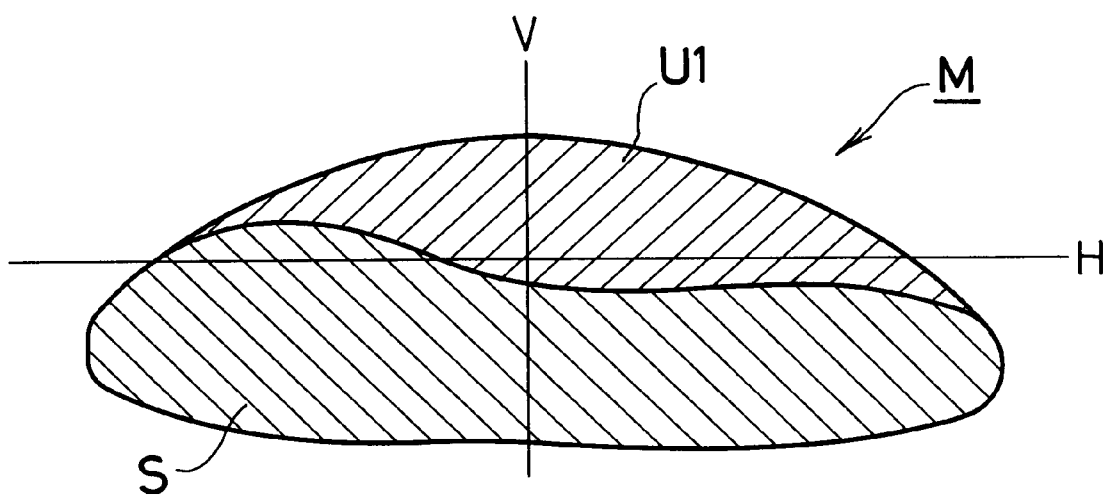
FIG. 5 is a view illustrating the drive beam distribution of the same embodiment as above.

Accordingly, light distribution in the state is formed to be composition of the light reflected from the upper half 3a of the reflecting mirror 3 and a reflection light distribution U1 from the lower half 3b. This means that as shown in FIG. 5, a drive beam distribution M can be obtained by adding the passing beam distribution S formed of the reflection light from the upper half 3a with the reflection light distribution U1 from the lower half 3b. Therefore the head lamp for a vehicle according to the present invention needs not to have a drive arrangement exclusively for switching the passing beam distribution S over the drive beam distribution M.

It was assumed above that if the actuator 4 was moved to the beam change position B, the reflecting mirror 3 was made to have roughly horizontal optical axis that was a rotation center of the paraboloid of revolution. However, the reflecting mirror 3 in an actual embodiment may not always have horizontal optical axis as the actuator 4 should also do a leveling actuation.

That is, if the beam change position B is set on a side of angle of elevation in the leveling actuation range A (in the state shown in FIG. 1), the reflecting mirror 3 is set to a maximum angle of elevation in the leveling actuation with the actuator 4 moved to the beam change position B. If the beam change position B is set on a side of angle of depression in the leveling actuation range A, on the other hand, the reflecting mirror 3 may be set to a maximum angle of depression in the leveling actuation In the passing beam distribution S, as made clear above, the lower half 3b of the reflecting mirror 3 is covered by the lower half shield 5b, resulting in no involvement for generating any light distribution. Instead, the lower half 3b is solely related to make the light reach the drive beam distribution M to generate total light distribution there.

Therefore, it is preferable that for example, if the actuator 4 is moved to the beam change position B, the entire reflecting mirror 3 is moved with the angle of elevation (see FIG. 1) and if the reflection light from the upper half 3a of the reflecting mirror 3 is made to contain upward light, the resultant light distribution should not contain any other upward light.

Figure 6:
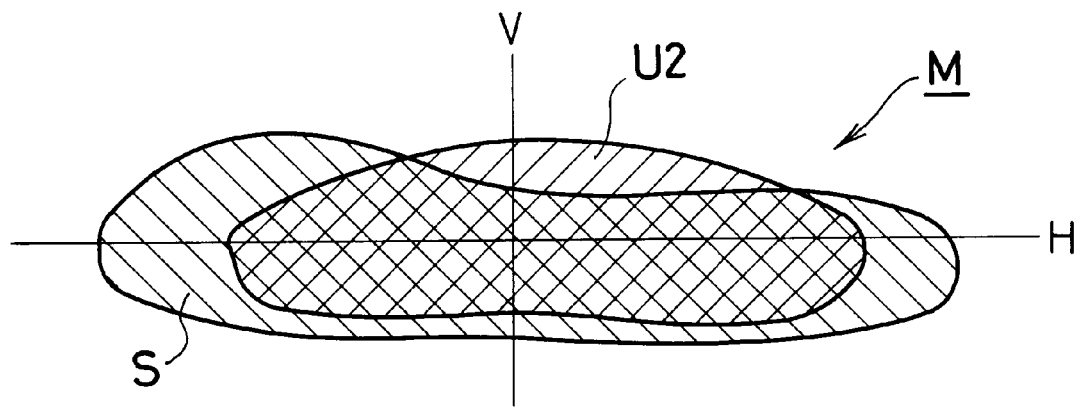
FIG. 6 is a view illustrating a drive beam distribution of another embodiment of the head lamp according to the present invention.
Figure 7:
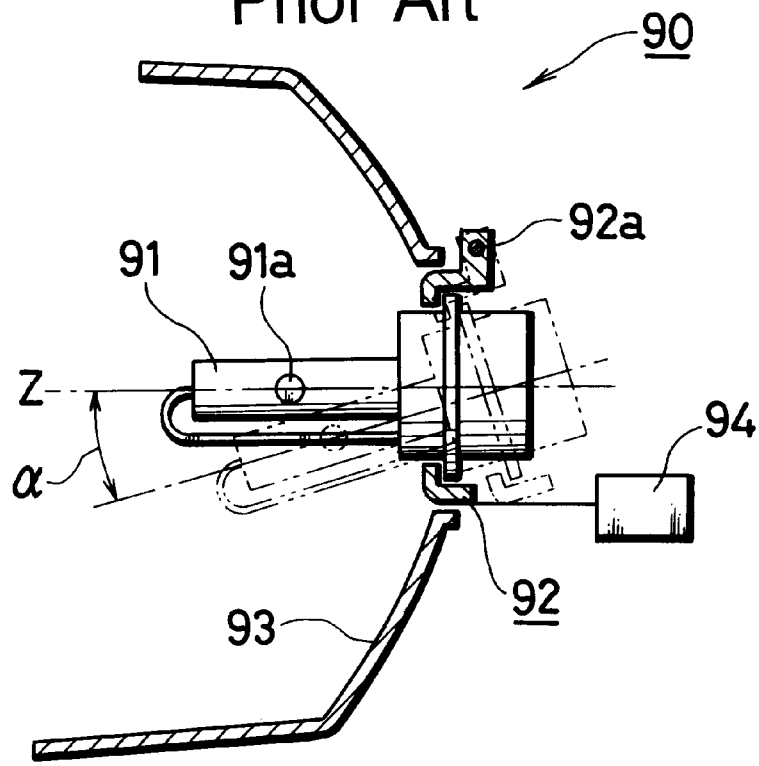
FIG. 7 is a cross-sectioned view illustrating major parts of a prior art.

In that case, with the reflecting mirror 3 elevated upward, the lower half 3b is formed to reflect a horizontal reflection light U2, thereby passing beam distribution S made to contain enough upward light at the angle of elevation, as shown in FIG. 6, is made to have the reflection light U2 overlapped thereon. This can achieve the drive beam distribution M providing high illumination in a forward direction.

As described above, the present invention provides a head lamp for a vehicle in which as actuation positions for an actuator there are provided a leveling actuation range corresponding to output from a vehicle body sensor and a beam change position out of the leveling actuation range when a beam changing switch is set to a drive beam position and in which if the actuator is moved to the beam change position at least a part covering a lower half of a reflecting mirror from a light source. Thereby it is possible to switch between a passing beam state and a drive beam state by the actuator for use in leveling operation which is essentially installed in a head lamp employing a discharge lamp as a light source because of legal regulation, resulting excellently in simplification of a construction of such a kind of a head lamp for a vehicle.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A head lamp for vehicle comprising:

a discharge lamp as a light source;

a reflecting mirror for reflecting a light from the discharge lamp;

a hood for generating a passing beam distribution by way of covering roughly lower half of the discharge lamp; and an automatic leveling device including an actuator for adjusting angles of elevation and depressions of the reflecting mirror as driven upon receipt of output from a vehicle body sensor for detecting an inclination of a vehicle body, wherein the actuator is made to be able to be moved to a leveling actuation range corresponding to the output from the vehicle body sensor and to a beam change position out of the leveling actuation range when a beam changing switch is set to a drive beam position, and if the actuator is moved to the beam change position at least a part covering a lower half of the discharge lamp of the hood is moved back to switch it from a passing beam state to a drive beam state.

2. The head lamp for a vehicle according to claim 1, wherein the hood comprises a direct light shield and a lower half shield and if the actuator is moved to the beam change position the lower half shield of the hood is moved back to switch it from the passing beam state to the drive beam state.

* * * * *